June 10, 1969 C. F. DESMOND 3,448,830
VISCOUS VIBRATION DAMPING
Filed Nov. 17, 1966 Sheet 1 of 2

INVENTOR.
CHARLES F. DESMOND
BY ATTORNEYS

June 10, 1969 C. F. DESMOND 3,448,830
VISCOUS VIBRATION DAMPING
Filed Nov. 17, 1966 Sheet 2 of 2
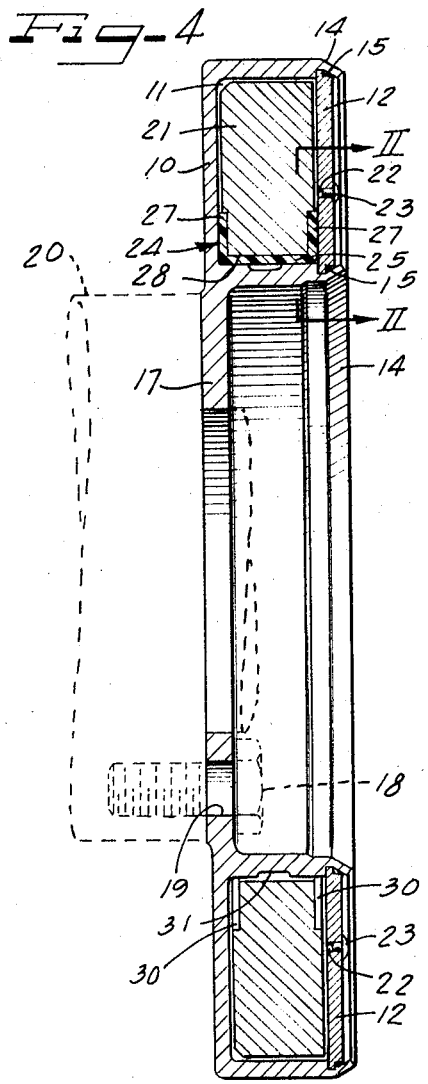
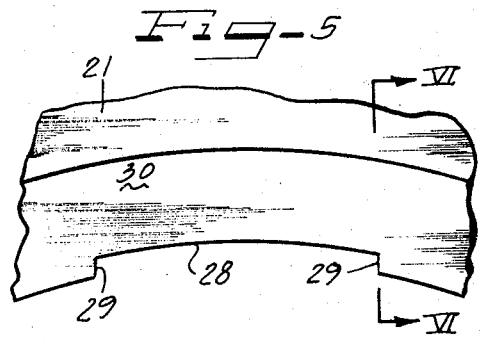
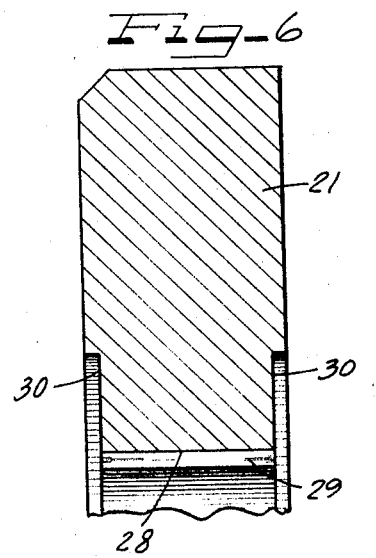
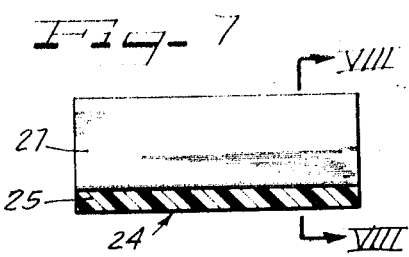
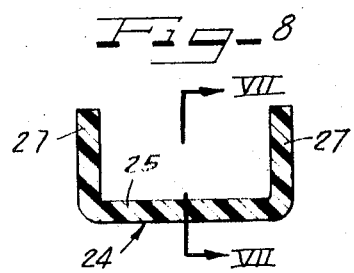
INVENTOR.
CHARLES F. DESMOND
BY ATTORNEYS United States Patent Office 3,448,830
Patented June 10, 1969

3,448,830
VISCOUS VIBRATION DAMPING
Charles F. Desmond, Williamsville, N.Y., assignor to Houdaille Industries, Inc., Buffalo, N.Y., a corporation of Michigan
Filed Nov. 17, 1966, Ser. No. 594,749
Int. Cl. F16d 57/00, 63/00
U.S. Cl. 188—1    10 Claims

ABSTRACT OF THE DISCLOSURE

Spring spacer means maintain shear film spaced relation between the confronting parallel working surfaces of a housing and an inertia mass within a working chamber of a vibration damper, the spacer means serving as sliding bearing and desirably frictional resistance damping means supplemental to the viscous shear damping coupling. In the specific disclosure the spring means comprise U-shaped non-metallic members warped and/or compressed between the surfaces engaged thereby.

---

This invention relates to viscous vibration damping and is especially adaptable for torsional vibration dampers such as may be used to damp torsional vibrations in shafts, crankshafts, and the like. Reciprocating piston engine crankshafts, such as those in diesel engines and other automotive and stationary engines, have crankshafts which are desirably equipped with this type of damper.

Dampers operating on the shear film principle, exemplified by U.S. Patent 2,514,136, dated July 4, 1950, comprise a housing defining a working chamber having therein a relatively movable inertia mass, with confronting parallel working surfaces in shear film spaced relation, having regard to the viscosity of a damping fluid substantially filling the chamber between the members, and desirably comprising a silicone of predetermined viscosity. The spacing between the working surfaces is such that the adherent layers of the viscous fluid resists relative movement shearingly, thereby yieldably resisting relative movement of the inertia member and housing.

Not only should the shear film spacing between the working surfaces be maintained for highest damping efficiency, but also to avoid rubbing contact of the surfaces, especially in the presence of silicone damping fluid which has notably poor lubricating qualities between ferrous surfaces. Press fitted closely machined bronze bushing bearings have been used for this purpose with considerable success but the metal-to-metal contact of mating bearing surfaces has resulted in eventual wear and loss of damping efficiency as the spacing between the working surfaces varies from the optimum.

A problem encountered in torsional vibration dampers of the shear film viscous type has been in maintaining the relatively rotary inertia mass balanced in the housing. Various metal bearing arrangements, both rotary and bushing types, and non-metallic rotary bearings have heretofore been used with satisfactory results under particular operating conditions, but they have all been characterized by necessary bearing clearances between the inertia mass and the housing bearing surface. This causes at least a slight unbalance due to eccentric location of the inertia mass relative to the geometric center about which the device revolves. Under some operating conditions this is undesirable and even precludes use of this type of damper. For example, use of the viscous shear film torsional vibration dampers on the crankshafts of engines balanced by the "hot-balance" method is precluded due to the disadvantage of uncorrectable unbalance in the rotary mounting of the inertia mass flywheel, and the inability to effect balancing due to the hermetically sealed housing of the assembly.

Accordingly, it is an important object of the present invention to overcome the foregoing and other problems and to effect shear film viscous vibration damping more efficiently, economically, simply and in a manner to increase the working life of the damper units.

Another object of the invention is to provide novel spacer means in viscous vibration dampers.

A further object of the invention is to provide a vibration damper with novel spring spacer means.

Still another object of the invention is to provide new means for damping vibrations by yieldably frictionally and viscously resisting relative movement of the housing and the inertia mass of the damper.

Yet another object of the invention is to provide a viscous shear film damper including novel combination centering, spacing and bearing means.

A still further object of the invention is to provide a damper of the foregoing type in which the centering, spacing and bearing means also functions to afford supplemental frictional damping resistance to relative movement of the inertia mass and the housing.

Other objects, features and advantages of the present invention will be readily apparent from the following detailed description of certain preferred embodiments thereof taken in conjunction with the accompanying drawings in which;

FIGURE 4 is a diametrical sectional detail view taken substantially on the line IV—IV of FIGURE 1;

FIGURE 5 is an enlarged fragmentary elevational detail view of the inner marginal portion of the inertia member showing the spring retaining recess or socket;

FIGURE 6 is a fragmentary transverse sectional detail view taken substantially along the line VI—VI of FIGURE 5;

FIGURE 7 is a longitudinal sectional elevational view through one of the centering and spacer springs taken substantially along the line VII—VII of FIGURE 8; and FIGURE 8 is a transverse sectional view taken substantially along the line VIII—VIII of FIGURE 7.

Figure 1:
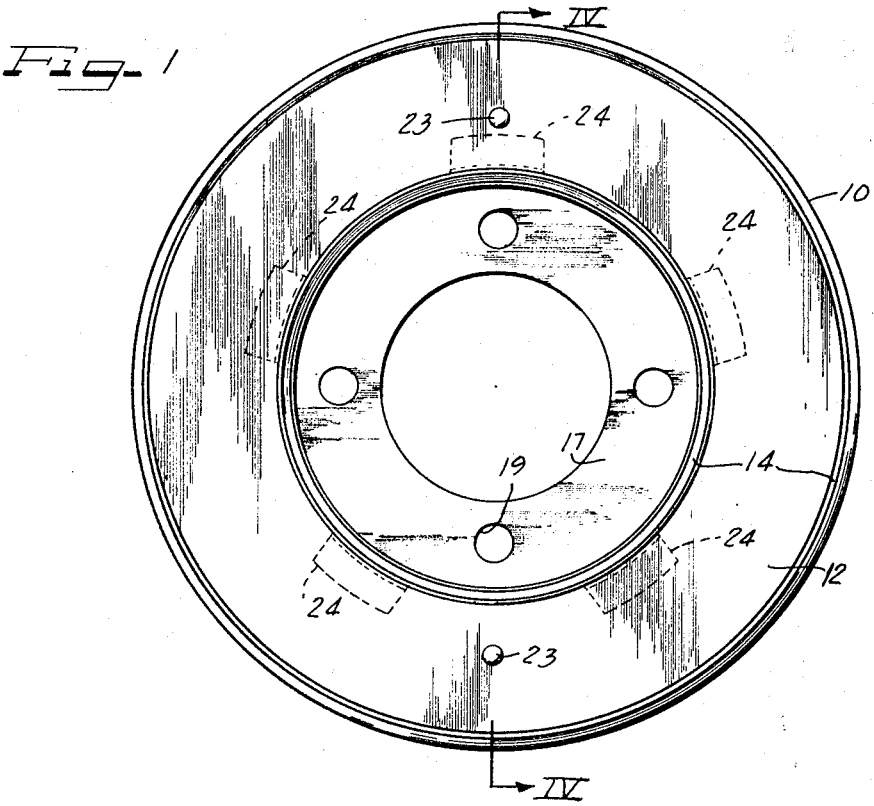
FIGURE 1 is a side elevational view of a representative embodiment of the invention comprising a torsional crankshaft damper.
Figure 2:
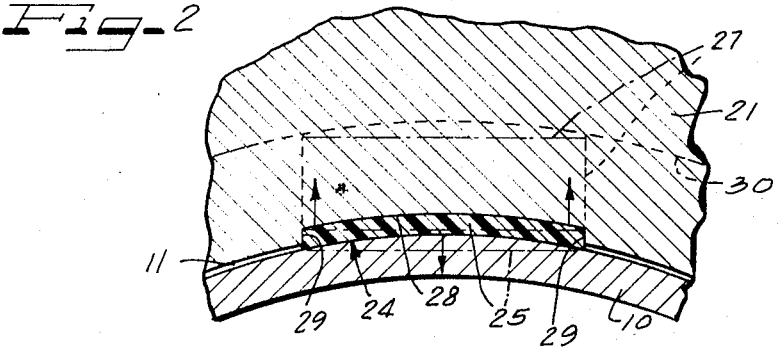
FIGURE 2 is an enlarged fragmentary sectional detail view taken substantially along the line II—II on FIGURE 4.

Referring to FIGURES 1 and 4, the representative viscous shear film damper is of the type especially adapted for damping torsional vibrations in the crankshaft of an internal combustion engine, especially of the reciprocating piston type such as a diesel engine, although not limited thereto. Such a damper comprises a circular housing 10 which in one desirable form is a one-piece metal casting defining an annular working chamber 11 which opens from one axial side thereof and is closed and hermetically sealed by means of a complementary annular cover plate 12 secured by turned over flanges 14, with sealing means 15 in the respective joints. Radially inwardly from the chambered housing portion is an integral radially extending hub flange 17 by which the damper unit is adapted to be secured as by means of fastening screws 18 extending through suitable holes 19 co-rotatively to a member such as a crankshaft 20 subject to torsional vibrations to be damped.

Within the working chamber 11 is inertia mass means in the form of an annular solid metal member 21 generally complementary in shape to but of slightly smaller cross sectional dimensions than said working chamber. Desirably, the working chamber 11 and the inertia ring member 21 have a generally rectangular axial cross sectional shape with parallel confronting axially facing annular working faces on the inertia member and defining the inside of the working chamber housing at the axially opposite sides thereof, and at least outer perimeter parallel annular confronting working surfaces on the inertia member and the housing, although desirably confronting annular working surfaces are also provided on the inner perimeter of the mass and the housing. All of the working surfaces are predetermined to be in shear film spaced relationship having regard to the viscosity of a suitable damping fluid such as silicone substantially filling the working chamber 11 between the confronting working surfaces, and assuming a substantially balanced and concentric disposition of the inertia mass 21 within the working chamber. Filling of the working chamber with the liquid silicone is facilitated by the provision of filler holes 22 in diametrically opposite portions of the cover 12 and hermetically sealed after filling by means of suitable plugs 23.

According to the present invention, a substantially balanced, concentric uniformly spaced relationship of the inertia ring member 21 within and in respect to the working surfaces defining the working chamber 11 is afforded by mounting spring spacer means between and engaging both of the inertia member 21 and the housing within the working chamber. In one desirable form, such spring spacer means comprise a plurality of identically constructed members 24 (FIGS. 1, 7 and 8) disposed at suitable equally spaced circumferential positions between the inner perimeter of the inertia member 21 and the housing as the most convenient location although if preferred they could with equal effect be mounted between the outer perimeter of the inertia ring and the housing. In a preferred and economical construction, the spring spacers 24 comprise a non-metallic material of low coefficient of friction of stiffly elastomeric character compatible with the silicone damping medium. For this purpose the plastic material polytetrafluoroethylene (available commercially under the trademark "Teflon") has desirable properties, especially when reinforced by means such as glass fibers. Each of the spring spacers 24 comprises an elongated generally U-shaped configuration including a base wall or web 25 connecting respective integral coextensive side wall flanges 27. In their normal state, the webs 25 of the members 24 are desirably substantially straight longitudinally. As many or as few of the spring spacers 24 are used for any given diameter of damper unit as will provide the desired centering, balancing, and other functions. These and possibly other considerations will control the size of the spring spacers 24 relative to the damper dimensions, including length, width and depth, the thickness of the material in the web 25 and the flanges 27, and the like. As shown, the web 25 and the flanges 27 are of substantially the same thickness, but this may obviously be varied to afford desired spring characteristics, spacing capability, wear takeup facility, etc.

To enable relatively free rotary movement between the housing 10 and the inertia ring member 21, while maintaining the circumferential spacing of the spring spacers 24, they are mounted on either the housing member or the inertia member and engage the other of the members in sliding bearing relation. For example, suitable mounting recess sockets 28 (FIGS. 2, 4, 5 and 6) may be provided in the inner perimeter of the inertia member 21 of a length to receive the web flange 25 freely but in closely circumferentially confined relation between opposed retaining shoulders 29 defining the respective opposite ends of the socket. The depth of the socket 28 throughout its length is desirably less than the thickness of the web flange 25 equal to substantially the desired shear film spacing between the inner perimeter working surface of the inertia member and the opposing working surface of the housing. To accommodate the side flanges 27, the opposite faces of the inner margin of the inertia member 21 are recessed to provide annular respective rabbet grooves 30 which are of less depth than the thickness of the respective flanges 27 to substantially the extent of the shear film spacings between the opposite axial working faces of the inertia member and the housing.

On mounting the spring spacers 24, they are assembled with the inertia ring member 21 before the latter is placed into the annular cavity of the working chamber 11. Within the retainer socket 28, the web 25 of each of the spacers is resiliently bent from the normal straight condition thereof as shown in dot-dash outline in FIGURE 2 into conformity with the arcuate longitudinal shape of the base of the socket, which is on a radius parallel to the working surface inner perimeter of the inertia member and of the opposing working surface of the housing. Arcuate deformation of the web 25 from its flat plane is accompanied by conforming deflection of the side flanges 27 in their respective planes. As a result, after the inertia member 21 and the assembled spacers 24 have been inserted into the housing, not only do the spacers 24 provide immediate substantially uniform shear film spacing between all confronting working surfaces, but also continuously maintain a concentric, balanced relationship of the inertia member 21 within the working chamber 11. This balanced relationship is maintained throughout the life of the damper and even though wear may eventually occur in the sliding bearing surface of the web 25, because there is a substantial continuous spring action of the web thrusting radially against the respective opposed surfaces of the inertia member within the socket 28 and the housing due to the reaction created by the web 25 and the flanges 27 tending to return to the normal straight condition thereof. This reaction is schematically indicated by the directional arrows in FIGURE 2 indicating spring thrust of the end portions of the spacer toward the inertia member 21 and spring thrust of the central portion of the spacer toward the housing, as the spacer tends to return from the assembled full line position to the dot-dash position.

Figure 3:
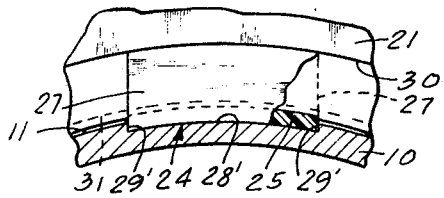
FIGURE 3 is a fragmentary sectional elevational detail view on the same scale as FIGURE 2 but showing a modification.

Instead of mounting the spring spacers 24 co-rotatively with the inertia ring 21, they may be mounted co-rotatively with the housing 10 and permit the inertia ring 21 to rotate or oscillate slidably relative thereto. In such an arrangement, as shown in FIG. 3, respective retaining recess sockets 28' defined at their opposite ends by respective retaining shoulders 29' are provided in the working surface on the selected perimeter of the housing 10, with the surfaces of the web 25 and flanges 27 which oppose the marginal portion of the inertia member 21 being in sliding bearing engagement therewith.

To assure equal distribution of the viscous damping medium between the confronting working surfaces about the perimeter interrupted at intervals by the spring spacers 24, the working surface perimeter of the housing in bearing engagement with the spacers is desirably provided with an annular distribution groove 31 where the spacers are co-rotatively mounted on the inertia ring (FIG. 4). Where, alternatively, the spacers 24 are mounted co-rotatively with the housing 10 as shown in FIGURE 3, such a distribution groove 31' may be provided in the working surface perimeter of the inertia member which opposes the webs 25 of the spacers in sliding bearing relation.

A further desirable function of the spring spacers 24 is that of affording frictional resistance damping supplemental to the viscous shear film coupling damping afforded by the viscous damping medium. Such frictional damping is one of the results of the radial spring tension thrust of the warped webs 25 of the spacers which may be supplemented by frictional damping resistance between the axial working surfaces of the inertia member and the housing and the flanges 27 of the spacers serving as spacer bearings and where they are placed under compressive pressure between the surfaces engaged thereby.

It will be understood that variations and modifications may be effected without departing from the spirit and scope of the novel concepts of this invention.

I claim as my invention:

1. In a vibration damper including housing means defining a working chamber and inertia mass means relatively movably enclosed in said chamber:
    viscous damping medium substantially filling said chamber between said means;
    said housing means and said inertia means having confronting working surfaces movable in parallel relation in the relative movements of said means and disposed in shear film spaced relation having regard to the viscosity of said damping medium;
    and spring spacers for maintaining said shear film spaced relation mounted on one of said means in said chamber and engaging the other of said means in sliding bearing relation.

2. A damper as defined in claim 1, in which said spring spacers comprise non-metallic members.

3. A damper as defined in claim 2, in which said spacers comprise a plastic material having the properties of polytetrafluoroethylene, and having reinforcing means therein.

4. A damper as defined in claim 1, in which the inertia mass means has a perimeter and marginal surfaces joining said perimeter, said chamber is defined by surfaces complementary to said perimeter and said marginal surfaces, and said spacers being of generally U-shaped cross section embracing said perimeter and said marginal surfaces and confronting said complementary surfaces in the chamber in spacing relation, said one of said means having respective retaining sockets therein within which the spacers are engaged and maintaining the positions of the spacers during relative movements of said means.

5. A vibration damper as defined in claim 1, comprising a torsional vibration damper in which said housing means comprise a circular structure having a hub for attaching it to a member such as a shaft subject to torsional vibrations, said chamber is of annular form, said inertia mass means comprise an inertia ring normally freely rotatably housed in said working chamber, said spring spacers of non-metallic substantially U-shaped form having web portions and spaced side flanges integral therewith, said web of each of the spacers engaging between a perimeter of the inertia ring and the opposing surface within the working chamber and the flanges engaging between the adjacent margins of the inertia ring and the opposing surfaces within the working chamber, said spring spacers being warped from a normal condition into general conformity with said perimeter, and shoulders on said one of said means retaining said spring spacers co-rotative therewith.

6. In a damper, constructed and arranged to be mounted coaxially on a member subject to torsional vibrations, and including a housing defining a working chamber having opposed spaced surfaces and a circular perimeter between said surfaces, and a complementary member including oppositely facing surfaces confronting said housing surfaces in spaced relation and a circular perimeter confronting said housing perimeter in spaced relation, said housing and said member being relatively rotatable, the improvement comprising:
    a plurality of circumferentially spaced spacers of U-shaped cross section each having a web between said perimeters and opposite side flanges between confronting surfaces of said member and said housing.

7. In a vibration damper including housing structure defining a working chamber having working surfaces, and inertia mass structure in relatively movable relation in said chamber with working surfaces of the inertia mass structure in confronting viscous shear film spaced relation to said chamber working surfaces having regard to predetermined viscosity of viscous damping medium filled into the working chamber and effecting a viscous shear damping coupling between said surfaces, the improvement comprising:
    spring spacer means in said chamber serving as sliding bearing between said structures and thereby maintaining said shear film spaced relation and maintaining said structures in balanced relation.

8. A damper according to claim 7, said working chamber being of circular form and said inertia mass structure comprising a circular member having a perimeter opposed to a complementary surface within the working chamber, said spring spacer means comprising a resiliently yieldable non-metallic part normally unconformed to said perimeter and being warped into substantial conformity with said perimeter and said complementary surface and thereby placing the spacer means part under spring tension and wear takeup thrust.

9. A damper according to claim 7, said sliding bearing spring spacer means being in frictional resistance damping relation to said structures supplemental to the viscouse shear damping coupling.

10. A damper according to claim 7, said spring spacer means comprising non-metallic material under pressure between said inertia mass structure and said housing structure and yieldably frictionally resisting relative movement of said structures.

References Cited
UNITED STATES PATENTS
2,736,393 2/1956 O'Connor _____ 188—1
2,636,399 4/1953 O'Connor.

DUANE A. REGER, *Primary Examiner.*

U.S. Cl. X.R.
29—451; 74—574